(12) United States Patent
Rastogi et al.

(10) Patent No.: US 7,508,147 B2
(45) Date of Patent: Mar. 24, 2009

(54) VARIABLE-FREQUENCY DRIVE WITH REGENERATION CAPABILITY

(75) Inventors: Mukul Rastogi, Murrysville, PA (US); Richard H. Osman, Pittsburgh, PA (US); Yusuke Fukuta, Pittsburgh, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 68 days.

(21) Appl. No.: 11/419,064

(22) Filed: May 18, 2006

(65) Prior Publication Data
US 2006/0274560 A1  Dec. 7, 2006

Related U.S. Application Data

(60) Provisional application No. 60/682,781, filed on May 19, 2005.

(51) Int. Cl.
*H02P 3/14* (2006.01)
(52) U.S. Cl. ............... 318/376; 318/759; 318/801
(58) Field of Classification Search ......... 318/762, 318/764, 801, 800, 771, 767, 759, 375, 807, 318/376; 363/65, 71, 68, 69
See application file for complete search history.

(56) References Cited

U.S. PATENT DOCUMENTS

| | | | | |
|---|---|---|---|---|
| 5,625,545 A | * | 4/1997 | Hammond | .......... 363/71 |
| 6,166,513 A | * | 12/2000 | Hammond | .......... 318/764 |
| 6,262,555 B1 | * | 7/2001 | Hammond et al. | .......... 318/759 |
| 6,301,130 B1 | * | 10/2001 | Aiello et al. | .......... 363/37 |
| 6,377,478 B1 | | 4/2002 | Morishita | |
| 6,411,530 B2 | | 6/2002 | Hammond et al. | |
| 6,417,644 B2 | * | 7/2002 | Hammond et al. | .......... 318/759 |
| 7,088,073 B2 | * | 8/2006 | Morishita | .......... 318/801 |
| 2001/0019253 A1 | * | 9/2001 | Hammond et al. | .......... 318/759 |
| 2004/0145337 A1 | * | 7/2004 | Morishita | .......... 318/801 |

FOREIGN PATENT DOCUMENTS

EP  1443634  8/2004

OTHER PUBLICATIONS

PCT Search Report—PCT/US2006/019574—mailed Oct. 11, 2006.
Remus Teodorescu et al.: "Multilevel Inverter by Cascading Industrial VSI" IEEE ransactions on Industrial Electronics, IEEE Service Center, NJ; vol. 49, No. 4, Aug. 4, 2002; XP011073752, pp. 832-833.

* cited by examiner

*Primary Examiner*—Paul Ip
(74) *Attorney, Agent, or Firm*—Pepper Hamilton LLP

(57) ABSTRACT

An electrical device includes a plurality of single-phase power cells electrically connected to receive power from a source and deliver power to a load. The single-phase power cells include a first rank of regenerative power cells and a second rank of non-regenerative power cells. Each non-regenerative power cell may include an inverter bridge, a capacitor set electrically connected across terminals of the inverter bridge, and a three-phase bridge rectifier electrically connected across the terminals. The non-regenerative power cells may provide reactive power when the plurality of cells are used for braking of a motor.

28 Claims, 9 Drawing Sheets

PRIOR ART

VARIABLE-FREQUENCY DRIVE WITH REGENERATION CAPABILITY

CROSS-REFERENCE TO RELATED APPLICATIONS

This patent application claims priority to, and incorporates by reference in its entirety, pending U.S. Provisional Patent Application No. 60/682,781, entitled "VFD with limited regeneration capability," filed May 19, 2005.

STATEMENT REGARDING FEDERAL SPONSORED RESEARCH

Not Applicable.

JOINT RESEARCH AGREEMENT

Not Applicable.

INCORPORATION BY REFERENCE OF MATERIAL ON DISC

Not Applicable.

BACKGROUND

In recent years, circuits for medium-voltage variable frequency drive (VFD) applications have received attention. Several novel methods have been introduced in the past decade. For example, in a circuit comprising series-connected inverters as described in U.S. Pat. No. 5,625,545 to Hammond, the disclosure of which is incorporated herein by reference in its entirety, an inverter or power cell 110 includes a three-phase diode-bridge rectifier 112, one or more direct current (DC) capacitors 114, and an H-bridge inverter 116. The rectifier 112 converts the input 118 alternating current (AC) voltage to a substantially constant DC voltage that is supported by the capacitors 114 that are connected across the rectifier 112 output. The output stage of the inverter 110 includes an H-bridge inverter 116 includes two poles, a left pole and a right pole, each with two devices. The inverter 110 transforms the DC voltage across the DC capacitors 114 to an AC output 120 using pulse-width modulation (PWM) of the semiconductor devices in the H-bridge inverter 116.

A circuit including power cells such as 110 in FIG. 1, when connected to a load, such as a motor, can provide power from an input source to the motor when operating in the motoring mode. However, when the motor speed needs to be reduced, power from the motor needs to be absorbed by the inverter. This mode of operation, when power must be absorbed by the inventor, is referred to as the regeneration mode. The diode-bridge rectifiers 112 in each power cell do not allow power to be transferred back to the source. Hence, the power absorbed by the circuit is strictly limited by the losses in the inverter and the capacitors within each power cell and is usually in the range of about 0.2% to about 0.5% of rated power.

The disclosure contained herein describes attempts to solve one or more of the problems described above.

SUMMARY

In an embodiment, a braking circuit includes an arrangement of power cells electrically connected to receive power from a source and deliver power to a load. The circuit includes a first rank of regenerative power cells, a second rank of non-regenerative power cells, and a control circuit. The output voltages of the regenerative power cells and non-regenerative power cells may be maintained at least substantially at their rated values when the load is operated at less than rated flux and less than rated current. The control circuit may at least substantially use the current capability of the regenerative power cells when the load is operated at rated flux and less than rated current. The control circuit may at least substantially use the current capability of the regenerative power cells and non-regenerative power cells when the load is operated at rated flux and full current. A voltage drop may occur across all of the cells during braking.

In some embodiments, each regenerative power cell may include an inverter bridge, a capacitor set electrically connected across terminals of the inverter bridge, and an active front end comprising a plurality of transistors electrically connected as a three-phase bridge. In an alternate embodiment, each regenerative power cell may include an inverter bridge, a capacitor set electrically connected across terminals of the inverter bridge, a three-phase diode bridge rectifier electrically connected across the terminals, and a series-connected transistor and resistor combination that is electrically connected across the terminals. In either embodiment, the inverter bridge may comprise, for example, a four-transistor H-bridge inverter or an eight-transistor H-bridge inverter based on a neutral-point-clamped connection.

In some embodiments, each non-regenerative power cell may include an inverter bridge, a capacitor set electrically connected across terminals of the inverter bridge, and a three-phase bridge rectifier electrically connected across the terminals. This inverter bridge also may comprise, for example, a four-transistor H-bridge inverter or an eight-transistor H-bridge inverter based on a neutral-point-clamped connection. In some embodiments, the regenerative power cells and non-regenerative power cells are removably and interchangeably installed in a housing.

In an alternate embodiment, an electrical device includes a plurality of single-phase power cells electrically connected to receive power from a source and deliver power to a load. The single-phase power cells include a first rank of regenerative power cells and a second rank of non-regenerative power cells. Each non-regenerative power cell may include an inverter bridge, a capacitor set electrically connected across terminals of the inverter bridge, and a three-phase bridge rectifier electrically connected across the terminals. The non-regenerative power cells may provide reactive power when the plurality of cells are used for braking of a motor.

In an alternate embodiment, an electrical device, includes a first rank that includes at least three single-phase non-regenerative power cells, a second rank that includes at least three single-phase regenerative power cells, and a control circuit. Each non-regenerative power cell includes an inverter bridge, a capacitor set electrically connected across terminals of the inverter bridge, and a three-phase bridge rectifier electrically connected across the terminals. When the device is used for braking of a motor, a three-phase power cell is not required, and the non-regenerative power cells provide reactive power.

BRIEF DESCRIPTION OF THE DRAWINGS

Aspects, features, benefits and advantages of the present invention will be apparent with regard to the following description and accompanying drawings, of which.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. In addition, the following terms are intended to have the following definitions herein:

capacitor set—one or more capacitors.

comprising—including but not limited to.

control circuit—a first electrical device that signals a second electrical device to change a state of the second electrical device.

electrically connected or electrically coupled—connected in a manner adapted to transfer electrical energy.

Figure 1:
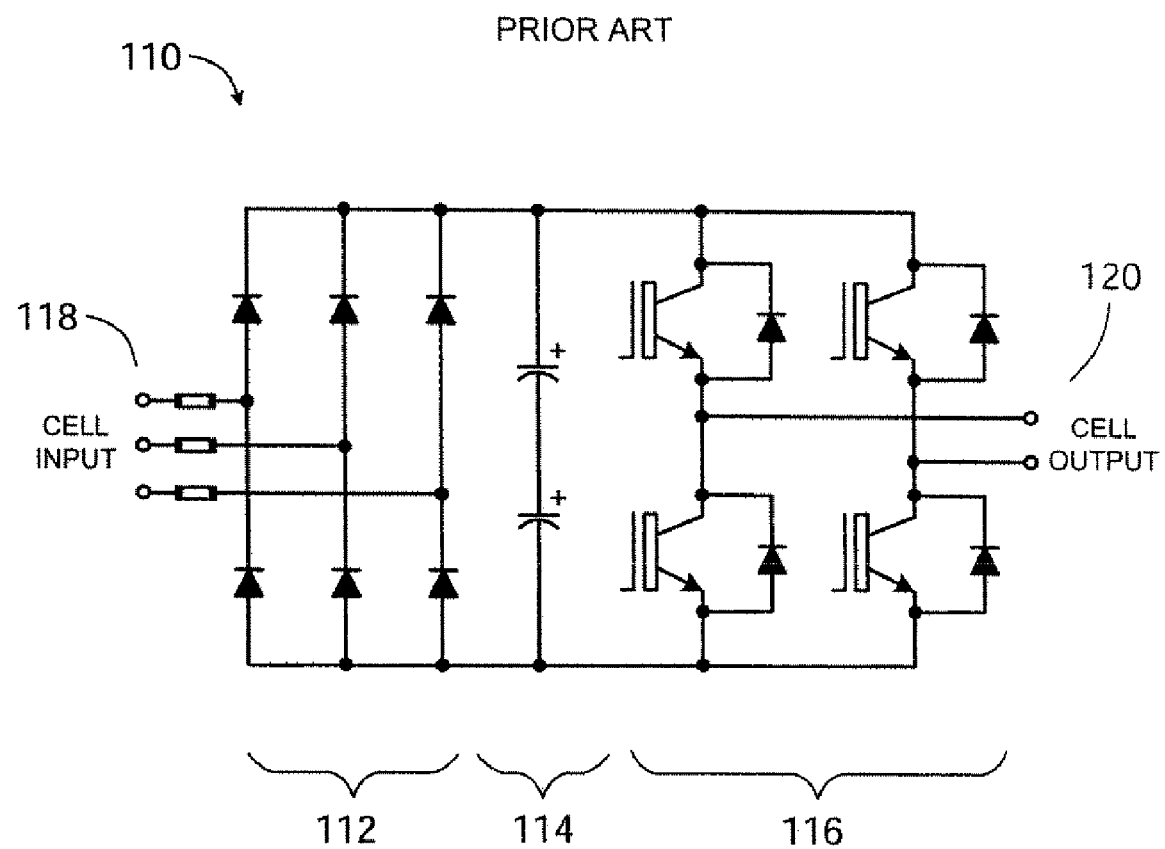
FIG. 1 depicts a prior art power cell.

H-bridge inverter—a circuit for controlled power flow between AC and DC circuits having four transistors and four diodes. Referring to FIG. 1, an H-bridge inverter 116 generally includes a first phase leg and a second phase leg electrically connected in parallel. Each leg includes two transistor/diode combinations. In each combination, the diode is electrically coupled across the base and emitter of the transistor.

inverter—a device that converts DC power to AC power or AC power to DC power.

medium voltage—a rated voltage greater than 690 volts (V) and less than 69 kilovolts (kV). In some embodiments, medium voltage may be a voltage between about 1000 V and about 69 kV.

neutral-point clamped connection—in the context of an eight-transistor H-bridge inverter, an arrangement of eight transistors to include a first phase leg and a second phase leg electrically connected in parallel at the DC terminals. Each leg includes four transistors. The mid-point between the upper pair of transistors and the mid-point between the lower pair of transistors of each phase leg is electrically connected through diodes to form a neutral point.

non-regenerative power cell—a power cell that does not have the capability of absorbing regenerative power.

power cell—an electrical device that has a three-phase alternating current input and a single-phase alternating current output.

rank—an arrangement of power cells established across each phase of a three-phase power delivery system.

rated speed—the number of times that the shaft of a motor may turn in a time period, such as revolutions per minute (RPM), when it is operating at its rated torque.

regenerative power cell—a power cell that has the capability of absorbing regenerative power.

substantially—to a great extent or degree.

three-phase bridge rectifier—a device including an arrangement of semiconductive devices such diodes that converts three-phase alternating current to direct current.

Figure 2:
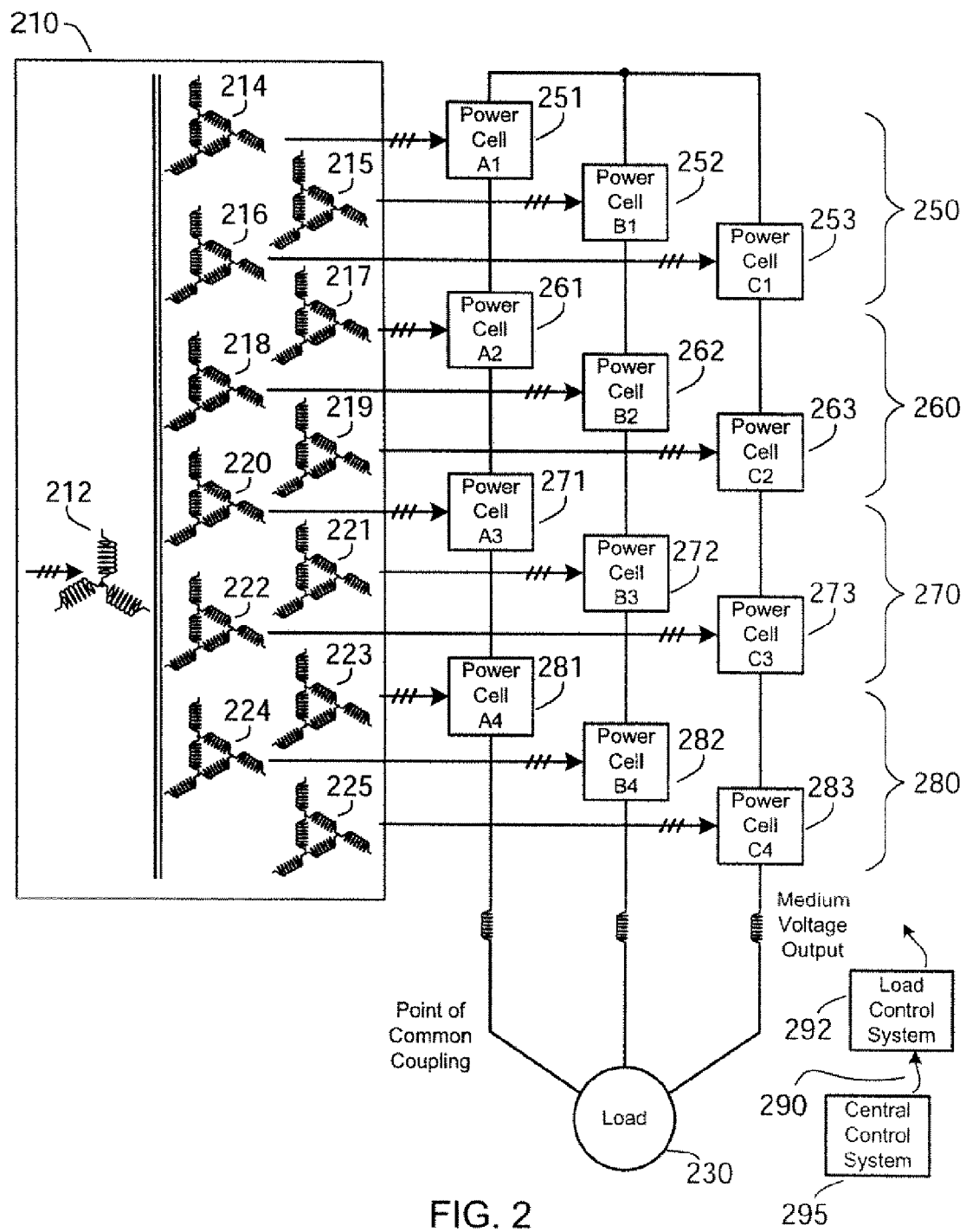
FIG. 2 depicts a circuit comprising a plurality of power cells connected to a load.

In various embodiments, a multi-level power circuit uses single-phase series-connected regenerative cell and non-regenerative cell inverters to provide limited braking capability. FIG. 2 illustrates an exemplary embodiment of a circuit having such inverters. In FIG. 2, a transformer 210 delivers three-phase, medium-voltage power to a load 230 such as a three-phase induction motor via an array of single-phase inverters (also referred to as power cells). A three-phase inverter is not required in the array. The transformer 210 includes primary windings 212 that excite a number of secondary windings 214-225. Although primary winding 212 is illustrated as having a star configuration, a mesh configuration is also possible. Further, although secondary windings 214-225 are illustrated as having a mesh configuration, star-configured secondary windings are possible, or a combination of star and mesh windings may be used. Further, the number of secondary windings illustrated in FIG. 2 is merely exemplary, and other numbers of secondary windings are possible. The circuit may be used for medium voltage applications or, in some embodiments, other applications.

Any number of ranks of power cells are connected between the transformer 210 and the load 230. A "rank" is considered to be a three-phase set, or a group of power cells established across each of the three phases of the power delivery system. Referring to FIG. 2, rank 250 includes power cells 251-253, rank 260 includes power cells 261-263, rank 270 includes power cells 271-273, and rank 280 includes power cells 281-283. Fewer than four ranks, or more than four ranks, are possible. A central control system 295 sends command signals to local controls in each cell over fiber optics or another wired or wireless communications medium 290.

Figure 3A:
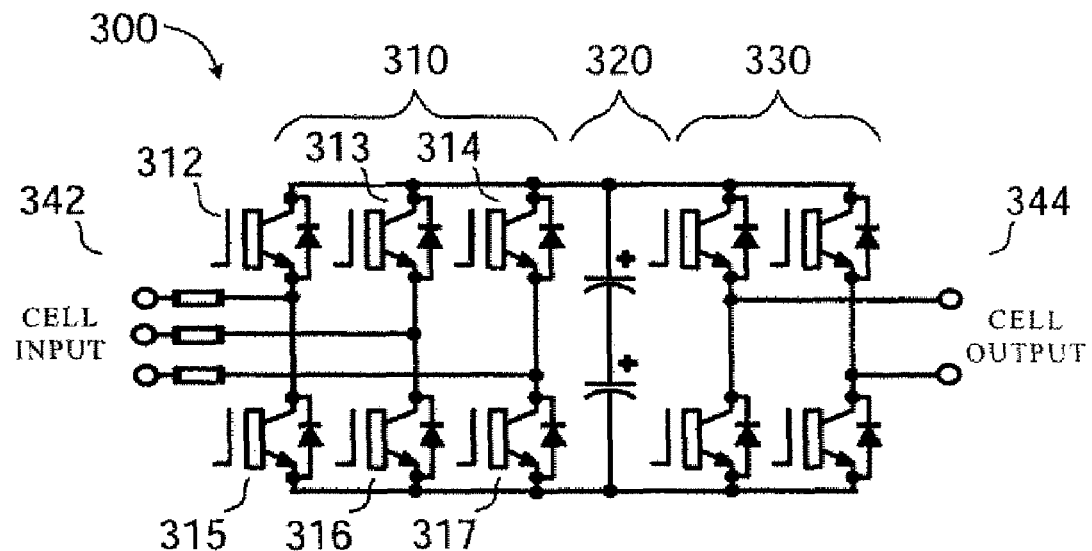
FIGS. 3A and 3B are a block diagram of exemplary regenerative power cells.
Figure 3B:
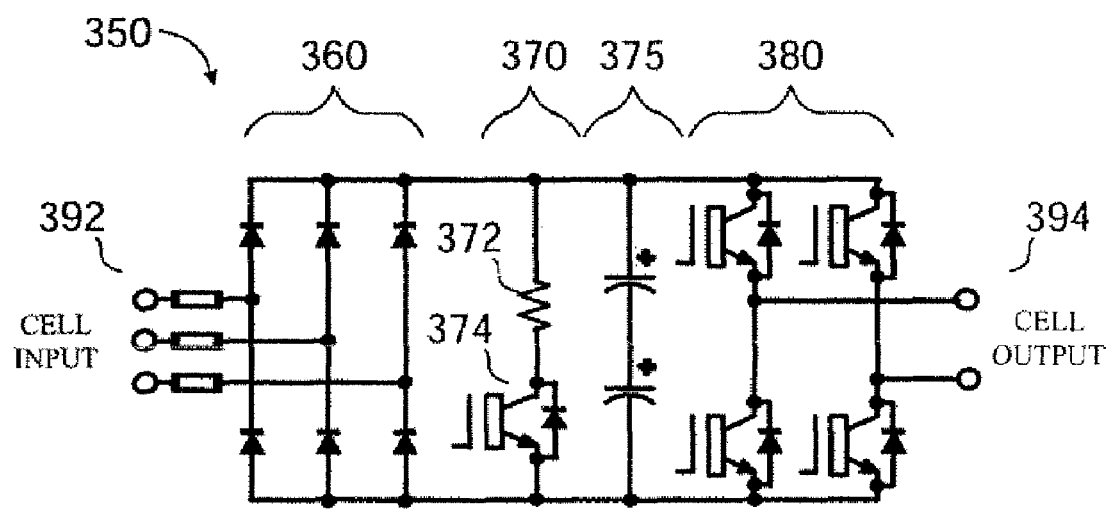

As mentioned above, the prior art power cells such as those illustrated in FIG. 1 do not allow any significant amount of regeneration. In order to achieve the desired braking capability in the embodiments described herein, alternate power cells are used. FIGS. 3A and 3B show two embodiments of power cells that do permit regeneration. Referring to FIG. 3A, a power cell 300 includes an active front end 310 that serves as a three-phase bridge as it receives power from dedicated three-phase secondary windings of the transformer via an input 342. The cell 300 also includes a plurality of current-controlling devices such as transistors or thyristors 312-317, for example insulated gate bipolar transistors (IGBTs), integrated gate commuted thyristors or other devices, generally referred to herein as the front-end transistors. Although six transistors in a bridge format—in this example, three pairs of two transistors each connected in parallel across the DC terminals—are illustrated in FIG. 3A, other numbers of transistors may be used. These transistors can be controlled by a local and remote control system (292 and 295, respectively, in FIG. 2) to transfer energy in either direction thus allowing motoring or regenerating to full capacity (i.e., approximately or fully 100%). Any suitable method to achieve such operation with front-end transistors may be used. The remainder of the power cell 300 includes one or more capacitors 320 and an H-bridge inverter 330, each connected across the output or DC terminals of the active front end 310, to deliver AC power to the output 344. Other inverter bridges may be used as substitutes for the four-transistor H-bridge 330 illustrated in FIG. 3A. For example, an H-bridge comprising eight transistors based on the neutral-point clamped connection may be used.

In an alternate embodiment, FIG. 3B illustrates a power cell 350 which includes the elements of a rectifier 360, capacitors 375, and an inverter bridge such as an H-bridge inverter 380 connected in parallel between an input 392 and output 394. A three-phase diode bridge rectifier 360 receives power from dedicated three-phase secondary windings of the transformer via the input 392. In addition, a brake circuit 370 includes a transistor 374 (referred to herein as a brake transistor) and a resistor 372 electrically connected in series with respect to each other and in parallel across the DC capacitors 375 and the DC output of the rectifier 360. The brake transistor 374 is controlled by a local controller, and during motoring the brake transistor 374 is controlled to be "off" and does not participate in the energy transfer from the AC input 392 to the AC output 394. However, during regenerating the brake transistor 375 may be controlled to turn on and off in order to dissipate the energy from the motor in the resistor 372 and hence maintain the DC voltage across the capacitors 375 at a pre-determined value.

A power cell that allows power to be absorbed from the motor is referred to herein as a regenerative cell (RC), and a power cell that does not allow any significant amount of regeneration (such as the one shown in FIG. 1 and is described above) is referred to as a non-regenerative cell (NRC). Although two examples of RCs are shown in FIGS. 3A and 3B, other RC cells may be used in the embodiments described herein.

Thus, referring back to FIG. 2, ranks 250 and 270 may comprise regenerative cells, and ranks 260 and 280 may comprise non-regenerative cells, or vice-versa. It should be noted that the number of cells per phase depicted in FIG. 2 is exemplary, and more than or less than four ranks may be possible in various embodiments. For example, two ranks, four ranks, eight ranks, or other numbers of ranks are possible. In fact, the number of regenerative power cells used can be selected based on the desired degree of braking provided. In addition, the power cells may be removably installed in a housing so that a single housing unit may be used for various applications, with regenerative cells being exchanged for non-regenerative cells, or vice versa, depending on the desired application such as braking or regeneration desired.

To obtain full regeneration capability for a circuit such as that shown in FIG. 2, RCs may be used in the entire circuit of power cells. However, in many applications, the braking capability that is needed is a much smaller fraction of the rated capacity of the load, such as approximately 10 percent to approximately 20% for ship propulsion and large fan applications. The use of RCs in the entire circuit makes the solution more expensive than it needs to be. However, we have discovered an exemplary series-connected arrangement of inverters that provides limited, but not full, braking capability.

Figure 4:
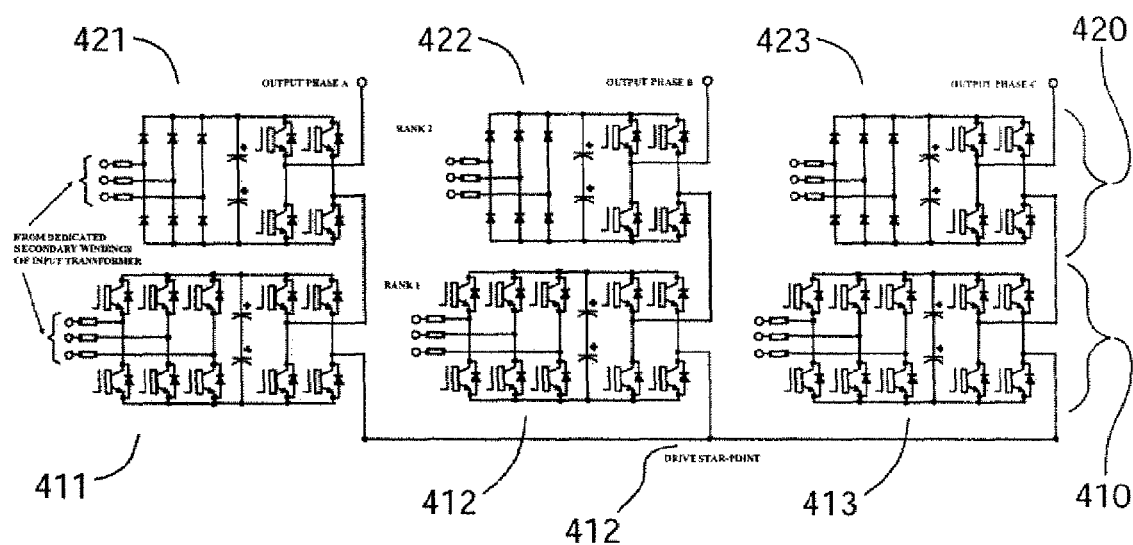
FIG. 4 is a diagram of an arrangement of regenerative power cells and non-regenerative power cells.

Referring to FIG. 4, a series-connected arrangement of inverters can be used to connect both RCs and NRCs within the same circuit. A first rank 410 includes three single-phase NRCs 411, 412 and 413 (one cell for each phase in a three-phase circuit), while a second rank 420 includes three single-phase RCs 421, 422 and 423 (also one for each phase). In this embodiment, three-phase power cells are not required. Each cell receives power from dedicated secondary windings of an input transformer (210 in FIG. 2). For each phase, a first output terminal of each RC cell is electrically connected to the output terminal of opposite polarity for the phase's corresponding NRC cell. The second output terminal of each RC cell is electrically connected to an output line. The remaining output terminals of all three RC cells in the rank are electrically connected to each other to form a star point 440. As shown in FIG. 2, additional ranks, such as four ranks total, six ranks total, eight ranks total, or more, may be present in the circuit. The number of ranks of RCs selected may be determined based on the desired level of regeneration required.

In some embodiments, the circuit may include a bypass feature that allows continued operation of the circuit if one or more of the power cells should fail. For example, as illustrated in U.S. Pat. No. 5,986,909, and in particular FIG. 1B and the accompanying text, which are incorporated herein by reference, a bypass may create a shunt path between the output lines of a power cell if the cell fails so that current can then flow through the bypass instead of the power cell.

Figure 5A:
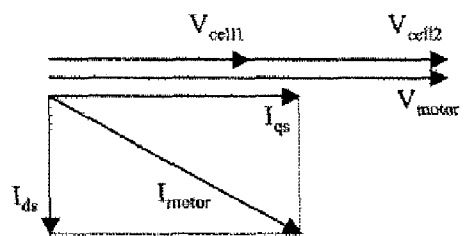
FIGS. 5A-5C illustrate exemplary voltage-current relationships for motoring, regeneration, and maximum braking in various embodiments.
Figure 5B:
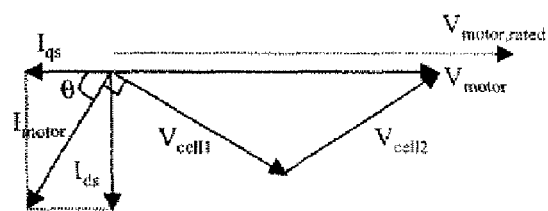
Figure 5C:
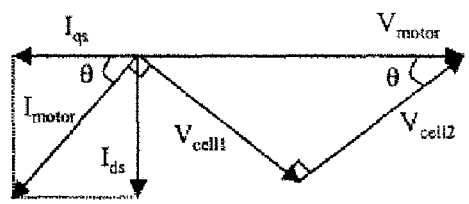

During motoring, the RC ranks and NRC ranks may provide a substantially equal amount of power to the load. However, during regeneration, the diode-bridge rectifiers in the NRC prevent transfer of power to the utility, but front-end transistors (AFE) in the RCs are controlled to absorb the braking energy by transferring power from the load (such as a motor) to the input source. The control of the front-end transistors may be the same as or similar to known control methods, such as the regulation of the DC-voltage within each RC. However, control of the output H-bridges may require different methods. For example, FIG. 4A illustrates exemplary voltage and current vectors during motoring, while FIG. 413 illustrates exemplary voltage and current vectors during regeneration, When motoring, as illustrated in FIG. 4A, the output voltage vectors of cell 1 (an RC) and cell 2 (an NRC) are along the motor voltage. Each power cell provides an equal or substantially equal amount of power to the load. Referring to FIG. 4B, during regeneration the voltage of cell 2 (NRC) is controlled to be in quadrature with respect to the drive current. This prevents cell 2 from absorbing any real (or active) power. However, the output of cell 1 (RC) must make up the difference between the motor voltage and the output of cell 2. This restricts the amount of available voltage that the drive can produce and will require reduced flux operation at high speeds during regeneration. When a mixture of NRC and RC are used, as shown in FIG. 4, maximum braking torque is obtained when the NRC and RC voltages are also in quadrature to each other as shown in FIG. 5C. Although it is noted that a quadrature relationship (of 90 degrees) is desired to maintain zero power flow into the NRC cells, for practical implementation this angle may be reduced below 90 degrees to ensure that either no power flows into the NRC cells or some power flows out of the NRC cells.

The approach of having both sets of cells ARC and RC) generate voltages during the entire braking process allows for continuous braking during the entire speed range. Unlike prior art methods, the methods described herein can produce regenerative torque before the motor speed has dropped below the voltage capability of the RC. The cells' output voltages are substantially used (with normal system losses) to provide power to the motor when the motor is running at or near its rated speed. When the motor voltage is reduced (as for braking), the NRCs and RCs also participate so that the NRCs provide reactive power during braking, and current is reversed through the RCs. This, unlike the prior art, all cells can participate during braking.

For the purpose of the following discussion, the following symbols are defined on a per-unit basis as follows:
Voltage capability of the RC, $V_{RC}$=x per-unit Voltage capability of the NRC, $V_{NRC}=(1-x)$ per-unit
Total voltage capability of drive=1.0 per-unit
No-load current of motor=$I_{NL}$
Speed below which rated flux can be applied on the motor=$w_V$
Speed below which rated current can be applied to the motor=$w_I$
Braking torque capability=$T_B$
Torque current=$I_{qs}$
Magnetizing current=$I_{ds}$
Motor speed=w
Motor voltage $V_{motor}$ To understand operation of an exemplary drive circuit with limited braking capability, the entire operating speed range may be considered to include three speed ranges as described below. During each speed range, there may be a separate limit on the achievable braking torque. This limit depends on the relative voltage capabilities of the RC and the NRC and the magnetizing current of the motor. Although the description below is in the context of an induction motor, similar results may be achieved with a synchronous motor by operating at reduced voltage on stator side. Although the total voltage capability of the drive is described below as having a unit value of 1.0, this value can be different from 1.0 as long as x is less than that value.

Speed Range #1: $w_V \leq w \leq 1.0$

Figure 6:
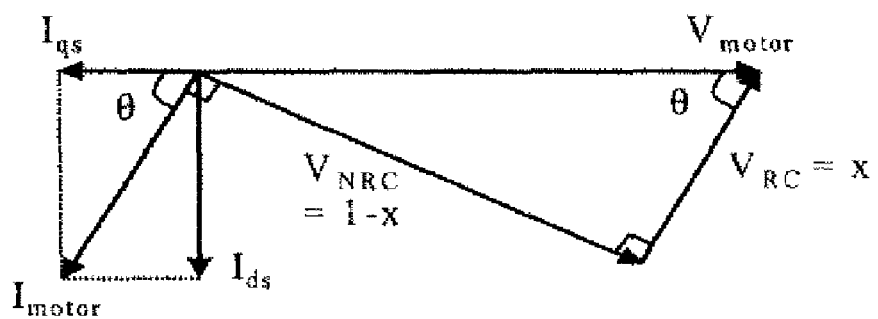
FIG. 6 illustrates an exemplary voltage-current relationship of a circuit in a motor speed range that is greater than the speed at which rated flux can be applied to the motor.

In this speed range, the drive cannot operate the motor at rated flux, because of the requirement to operate the NRC cell at quadrature with the motor current. Hence, the motor is operated at reduced flux and reduced current. Referring to FIG. 6, the maximum voltage output is given as:

$$V_{max}=\sqrt{(1-2x+2x^2)} \quad (1)$$

To increase or obtain maximum possible torque within this speed range, the motor may be operated at or near this maximum voltage. Therefore, the voltages for the cells are fixed at $V_{RC}=x$, and $V_{NRC}=(1-x)$. As speed decreases from rated speed, motor flux gradually increases until it equals its rated value at $w=w_V$. Hence, in per-unit terms, $w_V=V_{max}$. FReferring again to FIG. 6, torque current is obtained as:

$$I_{qs}=xI_{ds}/(1-x) \quad (2)$$

At rated speed the (minimum) braking torque capability then may be given by the following equation:

$$T_B=V_{max}I_{qs}\approx I_{NL}(1-2x+2x^2)x/(1-x) \quad (3)$$

where, it is assumed that at light loads and reduced flux $I_d \approx I_{NL}V_{max}$.

Speed Range #2: $w_I \leq w \leq w_V$

Figure 7:
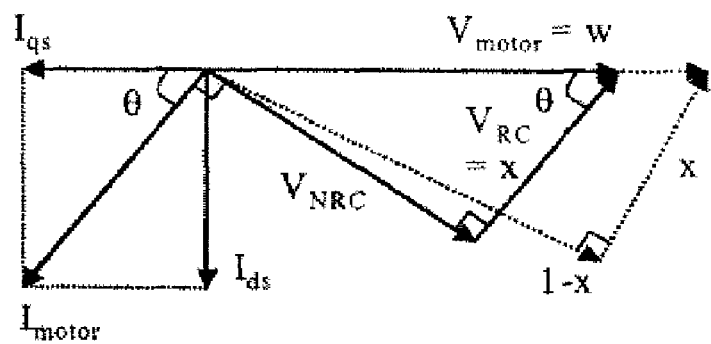
FIG. 7 illustrates an exemplary voltage-current relationship of a circuit in a motor speed range that is less than the speed at which rated flux can be applied to the motor but greater than the speed at which rated current can be applied to the motor.

In this speed range, the motor is operated at rated flux but reduced current, and the RC provides rated output. Hence, referring to FIG. 7:

$$V_{RC}=x, \text{ and } V_{NRC}=\sqrt{(w^2-x^2)}, \text{ where w represents the speed and the per-unit motor voltage,} \quad (4)$$

$$\text{and } I_{qs}=xI_{ds}/\sqrt{(w^2-x^2)} \quad (5)$$

As speed decreases, $I_q$ becomes larger and approaches rated torque current. When $w=w_I$ (where $w_I=x/PF\_rated$), rated current is applied to the motor and rated braking torque can be obtained.

Speed Range #3: $0 \leq w \leq w_I$

In this speed range, the motor is operated at rated flux and rated current. The voltages from the NRC and the RC are reduced linearly with speed as shown below, so that motor current is maintained at rated:

$$V_{RC}=xw/w_I \quad (6)$$

$$V_{NRC}=w\sqrt{(w_I^2-x^2)}/w_I. \quad (7)$$

The above equations show exemplary methods for controlled operation of the RCs and NRCs during regeneration. A block diagram showing an exemplary control system 800 to implement such equations in a typical motor drive controller is given in FIG. 8. In this figure, the "Flux Reference Generator" 805, "Limited Regen Voltage Allocation" 810 and "Regen Limit" 815 help to provide limited regeneration control. As shown in the figure, the exemplary circuit includes at least two inputs, the flux demand $\lambda_{DMD}$ 801 and the speed reference $w_{ref}$ 802. The Flux Reference Generator 805 calculates the flux reference using the maximum voltage given by equation (1) above and the stator frequency, $w_s$ 804, and provides the flux reference, $\lambda_{ref}$ 803, as an output. The Flux Reference Generator 805 also ensures that the flux reference is always less than or equal to the flux demand, $\lambda_{DMD}$ 801. The Flux Regulator 820 compensates for the difference between the flux reference, $\lambda_{ref}$ 803, and the flux feedback, $\lambda_{DS}$ 809, where $\lambda_{DS}$ 809 is the estimated actual flux value given by the measured motor voltage and the stator speed. The output of Flux Regulator 820 is the motor magnetizing current reference, $I_{ds\ ref}$ 821.

The speed reference, $w_{ref}$ 802, is compared with the motor speed, w 850, in the Speed Regulator 855, which provides the motor torque current reference, $I_{qs\ ref}$ 858 as the output, When the motor is commanded to stow down, the Regen Limit block 815 calculates equations (2) and (5) above and provides a limit on the torque current reference.

Figure 8:
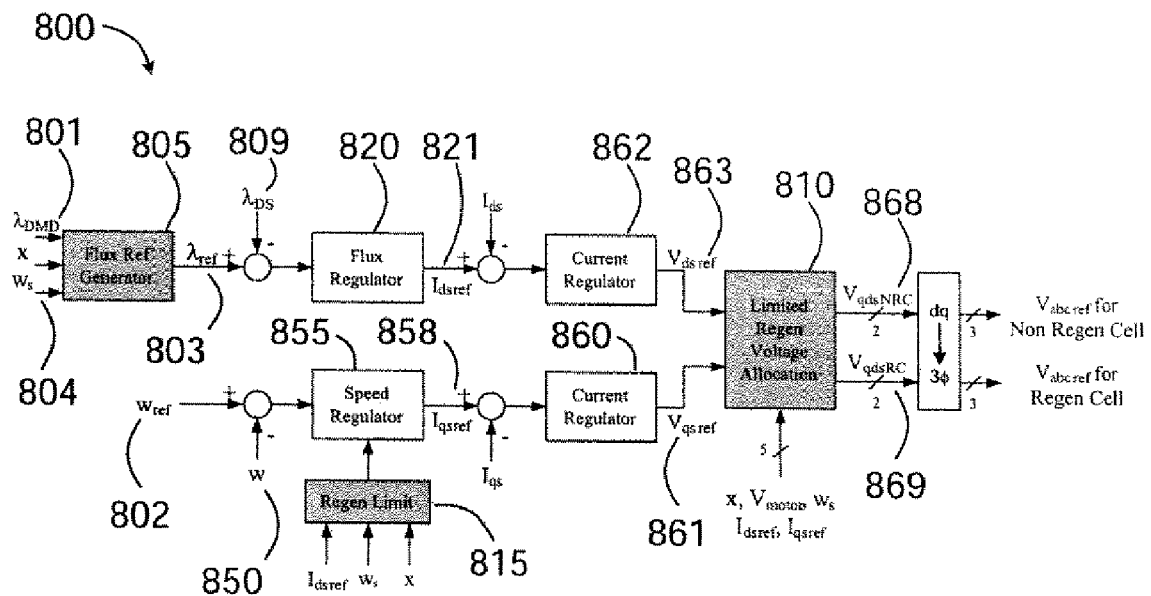
FIG. 8 is a block diagram of an exemplary control circuit.

The circuit shown in FIG. 8 includes two Current Regulators 860 and 862 that control the magnetizing current and the torque current. Their outputs are voltage references, $V_{ds\ ref}$ 863 and $V_{qs,ref}$ 861. The Limited Regen Voltage Allocation 810 block splits the motor voltage references, $V_{ds\ ref}$ 863 and $V_{qs,ref}$ 861, into voltage references for the RCs and NRCs. In the Limited Regen Voltage Allocation 810 block, the magnitude of the voltages for RC and NRC may be first found using x, $V_{motor}$ and $w_s$ from equations (4), (6) and (7) above. Then, the d- and q-axis components of the voltage commands for the NRCs and the RCs ($V_{qdsNRC}$ 868 and $V_{qdsRC}$ 869) are identified using $I_{ds\ ref}$ and $I_{qs\ ref}$. Finally, d- and q-axis components of VRC and VNRC are converted to 3-phase voltages in the stationary frame, and are used as references to generate PWM voltage commands for controlling the inverters.

FIGS. 9A-9D provide exemplary simulation results to show the operation in regeneration for a drive configuration such as that shown in FIG. 4 with x=0.5 (i.e. an equal number of RC's and NRC's). It should be noted that having an equal number of RCs and NRCs is not a requirement of the embodiments described herein. The drive may be commanded to go into regeneration at t=5 seconds by decreasing the speed reference $w_{ref}$.

Figure 9A:
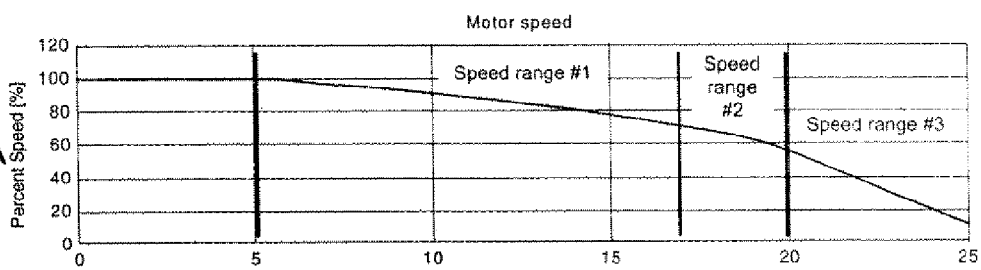
FIGS. 9A-9D illustrate simulation results of a variable frequency drive at various motor speeds.
Figure 9B:
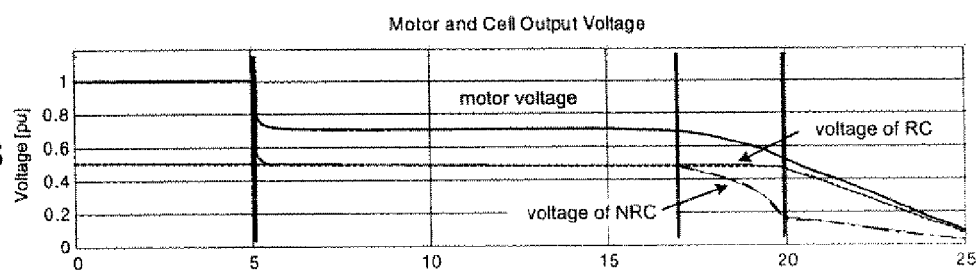

FIGS. 9A and 9B illustrate exemplary motor speed (FIG. 9A) and the output voltage (FIG. 9B) of a drive having a combination of RC and NRC ranks. In each Figure, time=0 to time=5 seconds represents motoring, while the remaining time periods represent different speed ranges of braking. Unlike the prior art, as illustrated in FIGS. 9A-9B, a voltage drop is present across the non-regenerative power cells during braking. In fact, such a voltage is present during the entire braking period.

Referring to FIG. 9B, during Speed Range #1 the drive output voltage is maintained at the value specified by the equation (1) while the output voltage of RC and NRC are held at their respected rated values (i.e. 100%). In the Speed Range #2, the voltage of NRC is reduced whereas the voltage of RC is maintained at its rated voltage as given by the equation (4).

As soon as the motor speed enters Speed Range #3, the voltage of both RC and NRC decreases linearly as the motor slows down as specified by equations (6) and (7).

Figure 9C:
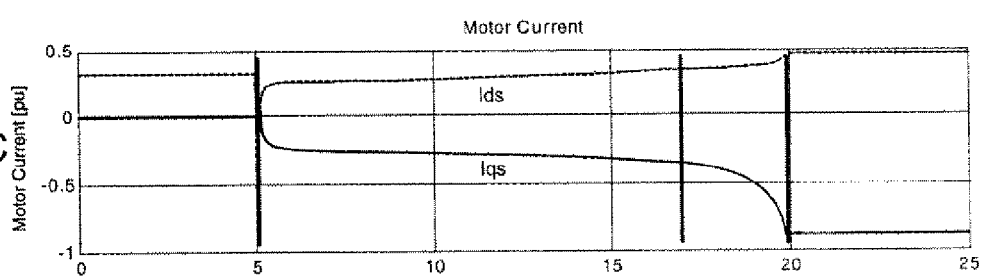

FIG. 9C shows exemplary motor current components during regeneration. In Speed Range #1, the magnetizing current ($I_{DS}$) is lowered to satisfy the maximum motor voltage specified by the equation (1). Subsequently, the torque current ($I_{QS}$) is also reduced so that the motor current remains in quadrature with respect to the output voltage of NRC as shown in FIG. 6. Throughout Speed Range #1, both the magnetizing current and the torque current increase equally in ratio so as to bring up the motor flux towards its rated value (i.e., approximately 100%) while maintaining the power factor and keeping the quadrature relation between the motor current and the output voltage of the NRC cells. During Speed Range #2, there is more room to accommodate the larger torque current as the voltage of NRC decreases, as evident from FIG. 7. As was mentioned earlier, Speed Range #3 starts at the instant when the total motor current reaches rated value.

Figure 9D:
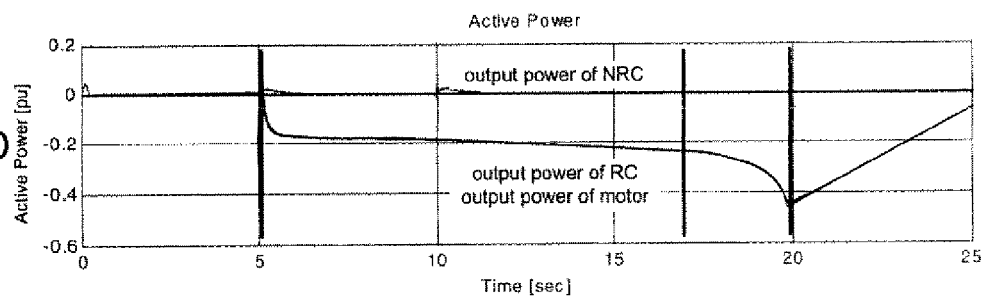

FIG. 9D shows active power delivered from the drive, the RC cells and the NRC cells. The active power from the NRC remains substantially zero throughout the duration of motor deceleration. In this example, all of the active power (or total power) from the motor is absorbed by the RC, thereby illustrating that the methods described herein may successfully divert all the power absorbed from the motor into the RC during regeneration. In addition, the generated power in the motor is controlled to be less than the power rating of RC.

As noted above, there may be a different number of RCs and NRCS than the examples expressly described above. When the combination of RCs to NRCs is changed, the value of braking torque at full speed also may change according to equation (3). This is tabulated in the following table of braking torque for different cell combinations, assuming motor no-load current, $I_{NL}$, equals 25%:

| Ratio of RC to NRC, x | Braking Torque @ full speed |
|---|---|
| 0.25 | 5.4% |
| 0.333 | 6.9% |
| 0.40 | 8.7% |
| 0.50 | 12.5% |
| 0.60 | 19.5% |
| 0.667 | 27.8% |

As noted above, when the bypass feature is provided with each of the power cells, then it is possible to operate the circuit if one or more of the power cells fail. Under such a condition, the equations provided above can still be applied, but with slight adjustments as detailed here. When one or more power cells are bypassed, the total voltage capability of the RC and the NRC may change to y and z, respectively, such that t=y–z. The same procedure as detailed in equations (1)-(7) above may be followed using t, y, z instead of 1.0, x, and 1-x to determine the operation of the control with a smaller number of power cells in the circuit.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background' summary, abstract, drawing figure, etc.) of I this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set; forth herein. In the event of such conflict, including a conflict that would render invalid any claim herein or seeking priority hereto, then any such conflicting information in such incorporated by reference material is specifically not incorporated by reference herein.

What is claimed is:

1. A braking circuit, comprising:
   an arrangement of power cells electrically connected to receive power from a source and deliver power to a load, the arrangement comprising:
   a first rank of regenerative power cells; and
   a second rank of non-regenerative power cells connected to the first rank of regenerative power cells; and
   a control circuit connected to the arrangement of power cells, wherein the control circuit is configured to generate PWM voltage commands for controlling the regenerative power cells and the non-regenerative power cells.

2. The circuit of claim 1, wherein a voltage drop is present across the non-regenerative cells during braking of the load.

3. The circuit of claim 1, wherein the output voltages of the regenerative power cells and non-regenerative power cells are maintained at least substantially at their rated values when the load is operated at less than rated flux and less than rated current.

4. The circuit of claim 3, wherein the control circuit at least substantially uses the current capability of the regenerative power cells when the load is operated at rated flux and less than rated current.

5. The circuit of claim 4, wherein the control circuit at least substantially uses the current capability of the regenerative power cells and non-regenerative power cells when the load is operated at rated flux and full current.

6. The circuit of claim 1, wherein each regenerative power cell comprises:
   an inverter bridge;
   a capacitor set electrically connected across terminals of the inverter bridge; and
   an active front end comprising a plurality of transistors electrically connected as a three-phase bridge.

7. The circuit of claim 1, wherein each regenerative power cell comprises:
   an inverter bridge;
   a capacitor set electrically connected across terminals of the inverter bridge;

a three-phase diode bridge rectifier electrically connected across the terminals; and a series-connected transistor and resistor combination that is electrically connected across the terminals.

8. The circuit of claim 7, wherein the inverter bridge comprises a four-transistor H-bridge inverter.

9. The circuit of claim 1 wherein each non-regenerative power cell comprises:
an inverter bridge;
a capacitor set electrically connected across terminals of the inverter bridge; and
a three-phase bridge rectifier electrically connected across the terminals.

10. The circuit of claim 9, wherein the inverter bridge comprises a four-transistor H-bridge inverter.

11. The circuit of claim 1, wherein the regenerative power cells and non-regenerative power cells are removably and interchangeably installed in a housing.

12. The braking circuit of claim 1, wherein the control circuit comprises:
a flux reference generator;
a torque current reference limiter; and
a limited regeneration voltage allocator configured to determine d-axis and q-axis components of reference voltages based at least in part on outputs of the flux reference generator and the torque current reference limiter.

13. The braking circuit of claim 12, wherein the control circuit further comprises means for converting the d-axis and q-axis components to three-phase voltages.

14. The braking circuit of claim 13, wherein the control circuit further comprises means for generating the PWM voltage commands based on the three-phase voltages.

15. An electrical device, comprising:
a plurality of single-phase power cells electrically connected to receive power from a source and deliver power to a load, the single-phase power cells comprising:
a first rank of regenerative power cells; and
a second rank of non-regenerative power cells; connected to the first rank of regenerative power cells;
wherein each non-regenerative power cell comprises:
an inverter bridge;
a capacitor set electrically connected across terminals of the inverter bridge; and
a three-phase bridge rectifier electrically connected across the terminals; and
a control circuit connected to the plurality single-phase power cells, wherein the control circuit is configured to generate PWM voltage commands for controlling the plurality of single-phase power cells,
wherein the non-regenerative power cells provide reactive power when the plurality of cells are used for braking of a motor.

16. The device of claim 15, wherein each regenerative power cell comprises:
an inverter bridge;
a capacitor set electrically connected across terminals of the inverter bridge; and
an active front end comprising a plurality of transistors electrically connected as a three-phase bridge.

17. The device of claim 15, wherein each regenerative power cell comprises:
an inverter bridge;
a capacitor set electrically connected across terminals of the inverter bridge;
a three-phase diode bridge rectifier electrically connected across the terminals; and a series-connected transistor and resistor combination that is electrically connected across the terminals.

18. The device of claim 15, wherein the control circuit comprises means for:
controlling a voltage drop across the non-regenerative cells during braking of the load;
maintaining output voltages of the regenerative power cells and non-regenerative power cells at least substantially at their rated values when the load is operated at less than rated flux and less than rated current;
at least substantially using the current capability of the regenerative power cells when the load is operated at rated flux and less than rated current; and
at least substantially using the current capability of the regenerative power cells and non-regenerative power cells when the load is operated at rated flux and full current.

19. The device of claim 15, wherein the control circuit comprises:
a flux reference generator;
a torque current reference limiter; and
a limited regeneration voltage allocator configured to determine d-axis and q-axis components of reference voltages based at least in part on outputs of the flux reference generator and the torque current reference limiter.

20. The device of claim 19, wherein the control circuit further comprises means for converting the d-axis and q-axis components to three-phase voltages.

21. The device of claim 20, wherein the control circuit further comprises means for generating the PWM voltage commands based on the three-phase voltages.

22. An electrical device, comprising:
a first rank comprising at least three single-phase non-regenerative power cells;
a second rank comprising at least three single-phase regenerative power cells connected to the first rank; and
a control circuit connected to the first and second ranks, wherein the control circuit is configured to generate PWM voltage commands for controlling the non-regenerative power cells and the regenerative power cells;
wherein each non-regenerative power cell comprises:
an inverter bridge;
a capacitor set electrically connected across terminals of the inverter bridge; and
a three-phase bridge rectifier electrically connected across the terminals; and
wherein when the device is used for braking of a motor, a three-phase power cell is not required, and the non-regenerative power cells provide reactive power.

23. The device of claim 22, wherein each regenerative power cell comprises:
an inverter bridge;
a capacitor set electrically connected across terminals of the inverter bridge; and
an active front end comprising a plurality of transistors electrically connected as a three-phase bridge.

24. The device of claim 22, wherein each regenerative power cell comprises:
an inverter bridge;
a capacitor set electrically connected across terminals of the inverter bridge;
a three-phase diode bridge rectifier electrically connected across the terminals; and
a series-connected transistor and resistor combination that is electrically connected across the terminals.

25. The device of claim 22, wherein the control circuit comprises means for:
- controlling a voltage drop across the non-regenerative cells during braking of the load;
- maintaining output voltages of the regenerative power cells and non-regenerative power cells at least substantially at their rated values when the load is operated at less than rated flux and less than rated current;
- controlling the regenerative power cells output substantially rated current when the load is operated at rated flux and less than rated current; and
- controlling the regenerative power cells and non-regenerative power cells to output substantially rated current when the load is operated at rated flux and full current.

26. The device of claim 22, wherein the control circuit comprises:
- a flux reference generator;
- a torque current reference limiter; and
- a limited regeneration voltage allocator configured to determine d-axis and q-axis components of reference voltages based at least in part on outputs of the flux reference generator and the torque current reference limiter.

27. The device of claim 26, wherein the control circuit further comprises means for converting the d-axis and q-axis components to three-phase voltages.

28. The device of claim 27, wherein the control circuit further comprises means for generating the PWM voltage commands based on the three-phase voltages.

* * * * *